3,585,178
PROCESS FOR THE PREPARATION OF CIS-1,4-
ISOPRENE POLYMER
Kohei Kasai, Yokohama-shi, and Toshio Namizuka, Tokyo, Japan, assignors to The Japanese Geon Company, Ltd., Tokyo, Japan
No Drawing. Filed Nov. 5, 1969, Ser. No. 874,364
Claims priority, application Japan, Nov. 13, 1968, 43/82,561
Int. Cl. C08d 3/10
U.S. Cl. 260—94.3
7 Claims

ABSTRACT OF THE DISCLOSURE

A process for the preparation of isoprene polymers of high cis-1,4-linkage content by polymerizing isoprene in an inert hydrocarbon solvent, in the presence of a catalyst composed essentially of organoaluminum compound and titanium tetrahalide, characterized in that at least a part of said hydrocarbon solvent is replaced by vinyl halide, whereby achieving effective control of the molecular weight of product polymer.

---

This invention relates to a process for the preparation of isoprene polymer. More particularly, the invention relates to a process for the preparation of cis-1,4-isoprene polymer of controlled molecular weight, which is characterized by addition of vinyl halide to the polymerization system.

Isoprene polymers of high cis-1,4-linkage contents possess the properties equalling those of natural rubber, and therefore are extremely useful elastomer as all-utility rubber. Various proposals have been heretofore made for their preparation. For example, use of a suspension composed of titanium tetrahalide and trialkylaluminum as the polymerization catalyst is known. Whereas, generally there is a certain finite range of suitable molecular weight for the polymer to be used as artificial rubber. That is, polymers of inherent viscosities ranging from 2–10 are normally considered as the satisfactory rubber substitute. The required value of inherent viscosity differs depending on specific utility. For example, as the base polymer for oil extension, generally higher inherent viscosities are required, and as the rubber requiring less milling time, the polymers of lower inherent viscosities are used.

Since it is required for the rubber-substituting polymers to have different molecular weights according to the intended utility, if there is an effective process in which molecular weight of the polymer can be freely controlled, the industrial significance of such a process will be indeed great. Particularly, isoprene polymers prepared under the catalytic action of organoaluminum compound-titanium tetrahalide catalyst exhibit substantially constant, relatively high Mooney viscosity almost irrelevantly to the conversion, at the conversions above 40%. Accordingly, a process for obtaining polymers of low Mooney viscosity with the described type of catalyst has long been sought for.

Conventionally, it is known to vary polymerization conditions as a means for controlling molecular weight of isoprene polymers. Normally the degree of polymerization is reduced under higher polymerization temperature. However, when one of the polymerization conditions is so changed, undesirable results simultaneously take place with the intended molecular weight control. For example, under a raised polymerization temperature the molecular weight of the product decreases, but deactivation reaction of the catalyst is thereby promoted, and changes in micro structure of the polymer is also caused. Whereas, when the polymerization temperature is lowered, the product's molecular weight increases but the polymerization rate is retarded, making the procedure quite inefficient for industrial scale operation. Furtheromre, organoaluminum compound titanium tetrahalide catalyst is extremely unstable, being occasionally destroyed or deactivated by oxygen, alcohol, and acetylene compounds.

Accordingly, the object of the present invention is to provide a process for controlling the molecular weight of isoprene polymers without noticeably reducing the polymerization activity of catalyst or changing the micro structure of the product, in the process for preparing isoprene polymers containing cis-1,4-linkage at high contents, by polymerization of isoprene in an inert hydrocarbon solvent, in the presence of a catalyst consisting essentially of organoaluminum compound and titanium tetrahalide.

We have engaged in extensive researches seeking to achieve such an object, and discovered that the molecular weight of polymer can be controlled by addition of vinyl halide to the polymerization system, as a substance which neither damages the unstable catalyst nor appreciably affects the rate of polymerization.

It is known to add vinyl chloride to a polymerization system to cause reduction in molecular weight of α-olefin polymers using Natta catalyst (Belgian Pat. No. 626,642). However, the Belgian patent is entirely silent on the polymerization of conjugated diene. Furthermore, in case of α-olefin polymerization, addition of only 1 wt. percent of vinyl chloride to the system invites remarkable decrease in the rate of polymerization. Whereas, in accordance with the invention the vinyl halide functions also as a solvent, which is a quite unexpected, unique feature of the subject process.

The catalysts used in the subject process are those normally referred to as Ziegler catalyst, which are composed essentially of (1) at least one of organoaluminum compounds of the general formula

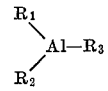

(in which $R_1$ is a member of the group consisting of hydrogen, halogen, alkyl, cycloalkyl, aryl and aralkyl groups, and $R_2$ and $R_3$ are selected from the group consisting of alkyl, cycloalkyl, aryl, and aralkyl groups, and (2) at least one of titanium tetrahalide. The catalyst may contain as a third component Lewis base such as nonpolymerizable ether, amines, etc. Examples of such organoaluminum compounds include trialkylaluminum such as triethylaluminum, triisobutylaluminum, trihexylaluminum, etc.; cycloalkylaluminum such as tricyclopentylaluminum, tricyclohexylaluminum, etc.; triarylaluminum such as triphenylaluminum, tri(o-, m-, and p-tolyl) aluminum, etc.; triaralkylaluminum such as tribenzylaluminum; and organoaluminum compounds such as diethylaluminum chloride, diethylaluminum hydride, etc. Also as the examples of titanium tetrahalide, tetrafluoride, tetrachloride, tetrabromide and tetraiodide of titanium, and mixtures thereof may be named. Useful ethers as the third component include aliphatic ethers, aromatic ethers, mixtures thereof, and various types of cyclic ethers. As more specific examples, the following may be named: dimethyl ether, diethyl ether, di-n-butyl ether, diphenyl ether, anisole, styrene oxide, furane, tetrahydrofurane, and many compounds thereof. As the amines, any of primary, secondary and tertiary amines preferably containing alkyl groups of not more than 18 carbons, such as methylamine, dimethylamine, trimethylamine, diethylamine, triethylamine, tripropylamine, etc.; primary, secondary, and tertiary aryl and aralkyl amines such as phenylamine, diphenylamine, triphenylamine, tribenzylamine, etc.; alicyclic amine such as cyclohexylamine; and heterocyclic amines such as pyridine, N-ethylpiperizine, pyrrole, etc., can be used.

The matter of prime importance in the present invention is to replace at least a part of the inert hydrocarbon solvent used in the polymerization, e.g., aliphatic hydrocarbon such as n-butane, n-pentane, n-hexane, n-heptane, and the like; alicyclic hydrocarbon such as cyclohexane; aromatic hydrocarbon such as benzene, toluene, etc.; and mixtures of at least two of such hydrocarbons, with vinyl halide such as vinyl fluoride, vinyl chloride, vinyl bromide or vinyl iodide. Whereby isoprene polymers containing cis-1,4-linkages at high contents can be obtained without notably affecting the rate of polymerization, and causing no change in the micro structures of the polymers.

In the present invention, the average molecular weight of the product polymer (Mooney viscosity) can be very precisely controlled by regulating the quantitative ratio of the vinyl halide to the monomer to be polymerized, amount of the catalyst, and polymerization conditions. Also because the molecular weight of the polymer obtained under a fixed set of conditions changes in accordance with the mol ratio of vinyl halide to total solvent, an empirical graph or formula can be drawn for the molecular weight as a function of the mol ratio. Thus, by controlling said mol ratio while maintaining all other conditions constant, the polymer of required molecular weight can be obtained with good reproducibility. While it is possible to replace all the inert hydrocarbon solvent with vinyl halide, preferred range of substitution is up to 50% by weight. The molecluar weight is normally expressed by means of Mooney viscosity of the polymer (100° C., $ML_{1+4}$). As demonstrated in the later given working examples, the Mooney viscosity of 90 of a polymer obtained in the absence of vinyl halide can be easily reduced to as low as 40, in accordance with the subject molecular weight controlling method.

As already mentioned, the catalyst used in the subject process is extremely sensitive to oxygen, water, etc. Since those substances are thus detrimental to the catalytic activity, oxygen and water which may be contained in the monomer, inert solvent, and vinyl halide, must be thoroughly removed in advance. The polymerization is performed by first mixing the predetermined amounts of titanium tetrahalide, organoaluminum compound, and optionally Lewis base as the third component, and adding the resulting catalytic suspension to the polymerization system. In that case, the mol ratio between titanium tetrahalide and organoaluminum, Al/Ti, may range from 0.5 to 3.0, preferably from 0.7 to 1.5, and suitable amount of the catalyst per mol of monomer is 0.1–20 millimols of the titanium tetrahalide. The amount of monomer is variable over a relatively wide range, which is normally 10–40% by weight based on the total sum of the monomer and solvent. That is, 1.5–9 weight times the monomer of solvent is used. The polymerization reaction can be practiced at temperatures ranging −5–70° C.

Hereinafter the process of this invention will be explained, referring to examples.

EXAMPLES 1–9

A pressure bottle of 800 ml. in capacity was cleaned and dried, and the inside atmosphere thereof was thoroughly nitrogen-substituted. Into the bottle, isoprene, n-hexane, and vinyl chloride were added, with the ratio of vinyl chloride to the total solvent varied in each run as indicated in Table 1.

Separately, a flask of 200 ml. of capacity was cleaned, dried, and thoroughly nitrogen-substituted, followed by addition of 70 ml. of n-hexane solution of titanium tetrachloride (concentration: 1.43 mols/liter) thereinto. Then 26.5 ml. of n-hexane solution of triisobutylaluminum (concentration: 3.78 mols/liter) and 20 millimols of di-n-butyl ether were added, to form a catalyst suspension (Al/Ti/ether mol ratio = 1.0/1.0/0.2; titanium concentration: 1.0 mol/liter). This catalyst was added into the aforesaid pressure bottle with an injector, at a ratio of 7.5 millimols of titanium concentration per mol of the monomer, and the system was polymerized at 30° C. After completion of the polymerization, the content of pressure bottle was taken into methanol containing 2 wt. percent of phenyl-β-naphthylamine to be coagulated, and thereafter dried in vacuum at 70° C. for more than 12 hours. The yield, Mooney viscosity, micro structure, and chlorine content of thus dried product were then determined, micro structure by infrared absorption spectrum analysis, and the chlorine content, by combustion method in a flask.

The results of the experiments are shown in Table 1 below. It should be apparent from the chlorine contents indicated in Table 1 that the resultant isoprene polymers contain no vinyl chloride as mixed thereinto.

TABLE 1

| | Control 1 | 1 | 2 | 3 | 4 | 5 | 6 | 7 | 8 | 9 |
|---|---|---|---|---|---|---|---|---|---|---|
| n-Hexane (g.) | 292.4 | 276.6 | 257.2 | 251.1 | 239.0 | 235.0 | 227.0 | 175.0 | 153.0 | 0 |
| Vinyl chloride (g.) | 0 | 13.5 | 31.3 | 48.7 | 62.0 | 94.0 | 134.0 | 136.0 | 175.0 | 300.1 |
| Isoprene (g.) | 64.2 | 63.9 | 63.8 | 66.7 | 67.0 | 71.0 | 79.0 | 68.0 | 72.0 | 65.3 |
| Vinyl chloride/vinyl chloride plus n-hexane (wt. percent) | 0 | 4.6 | 10.9 | 16.2 | 20.6 | 28.6 | 37.2 | 43.7 | 58.4 | 100 |
| Conversion (percent) | 88.0 | 75.8 | 66.7 | 62.2 | 55.1 | 54.6 | 49.7 | 45.5 | 38.8 | 17.1 |
| Cis-1,4-linkage (percent) | 99 | 99 | 99 | 99 | 99 | 99 | 99 | 99 | 99 | 99 |
| 100° C. $ML_{1+4}$ | 90.0 | 82.5 | 74.7 | 71.0 | 70.0 | 66.0 | 62.0 | 57.5 | 53.0 | 40.0 |
| Chlorine content (wt. percent) | 0.4 | 0.4 | 0.3 | 0.4 | 0.4 | 0.3 | 0.5 | 0.4 | 0.3 | 0.4 |
| Polymerization time (hrs.) | 1.5 | 1.5 | 1.5 | 1.5 | 1.5 | 2.5 | 2.5 | 2.5 | 2.5 | 2.5 |

EXAMPLES 10–11

Similarly to Examples 1–9, isoprene was polymerized under addition of vinyl bromide, at 30° C. for an hour. The results were as given in Table 2 below.

TABLE 2

| | Control 2 | 10 | 11 |
|---|---|---|---|
| n-Hexane (g.) | 295.0 | 283.0 | 287.6 |
| Vinyl bromide (g.) | 0 | 4.4 | 10.5 |
| Isoprene (g.) | 65.2 | 62.5 | 63.1 |
| Vinyl bromide/(vinyl bromide plus n-hexane) (wt. percent) | 0 | 1.5 | 3.5 |
| Conversion (percent) | 67.3 | 52.7 | 45.2 |
| Cis-1,4-linkage (percent) | 99.0 | 99.0 | 99.0 |
| 100° C. $ML_{1+4}$ | 92.5 | 85.0 | 77.5 |

We claim:

1. In a process for the preparation of isoprene polymers of high cis-1,4-linkage contents which comprises polymerizing isoprene in 1.5–9 weight times thereof of an inert hydrocarbon solvent, in the presence of a catalyst consisting essentially of an organoaluminum compound of the formula:

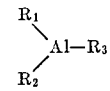

wherein $R_1$ is selected from hydrogen, halogen, alkyl, cycloalkyl, aryl and aralkyl groups and $R_2$ and $R_3$ are selected from alkyl, cycloalkyl, aryl and aralkyl groups, and a titanium tetrahalide in which the mol ratio of aluminum to titanium ranges from 0.5 to 3.0, the improvement wherein at least a part of the hydrocarbon solvent is replaced with vinyl halide, whereby effective control of the molecular weight of the isoprene polymer is achieved.

2. The process of claim 1, in which the vinyl halide is vinyl fluoride.

3. The process of claim 1, in which the vinyl halide is vinyl chloride.

4. The process of claim 1, in which the vinyl halide is vinyl bromide.

5. The process of claim 1, in which the vinyl halide is vinyl iodide.

6. The process of claim 1, in which the cataylst is used in such an amount that the titanium tetrahalide therein ranges 0.1–20 millimols per mol of isoprene.

7. The process of claim 1, in which the polymerization reaction is performed at −5 to +70° C.

References Cited

UNITED STATES PATENTS

| | | | |
|---|---|---|---|
| 2,694,054 | 11/1954 | Thomas et al. | 260—85.3 |
| 3,029,231 | 4/1962 | Amerongen | 260—87.5 |

FOREIGN PATENTS

| | | | |
|---|---|---|---|
| 851,113 | 10/1960 | Great Britain | 260—94.3 |

JOSEPH L. SCHOFER, Primary Examiner

R. A. GAITHER, Assistant Examiner